(12) United States Patent
Kim et al.

(10) Patent No.: US 8,432,365 B2
(45) Date of Patent: Apr. 30, 2013

(54) APPARATUS AND METHOD FOR PROVIDING FEEDBACK FOR THREE-DIMENSIONAL TOUCHSCREEN

(75) Inventors: Young Hwan Kim, Seoul (KR); Deok Hwa Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 745 days.

(21) Appl. No.: 12/202,025

(22) Filed: Aug. 29, 2008

(65) Prior Publication Data
US 2009/0058829 A1  Mar. 5, 2009

(30) Foreign Application Priority Data

Aug. 30, 2007 (KR) .................. 10-2007-0087828
Sep. 3, 2007 (KR) .................. 10-2007-0089036

(51) Int. Cl.
*G06F 3/041* (2006.01)
(52) U.S. Cl.
USPC ........................................ 345/173; 178/18.01
(58) Field of Classification Search .... 178/18.01–19.07; 345/173–178; 715/700–866
See application file for complete search history.

(56) References Cited

U.S. PATENT DOCUMENTS

| | | |
|---|---|---|
| 4,698,625 A | 10/1987 | McCaskill et al. |
| 5,119,079 A | 6/1992 | Hube et al. |
| 5,347,295 A | 9/1994 | Agulnick et al. |
| 5,579,037 A | 11/1996 | Tahara et al. |
| 5,736,974 A | 4/1998 | Selker |
| 5,754,873 A | 5/1998 | Nolan |
| 5,757,358 A | 5/1998 | Osga |
| 5,805,165 A | 9/1998 | Thorne, III et al. |
| 5,986,639 A | 11/1999 | Ozawa et al. |
| 6,049,326 A | 4/2000 | Beyda et al. |
| 6,429,846 B2 | 8/2002 | Rosenberg et al. |
| 6,717,600 B2 | 4/2004 | Dutta et al. |
| 6,874,126 B1 | 3/2005 | Lapidous |
| 6,992,702 B1 | 1/2006 | Foote et al. |
| 7,030,861 B1 | 4/2006 | Westerman et al. |
| 7,038,659 B2 | 5/2006 | Rajkowski |
| 7,084,859 B1 * | 8/2006 | Pryor ............................ 345/173 |
| 7,091,886 B2 * | 8/2006 | DePue et al. .................... 341/33 |
| 7,653,883 B2 * | 1/2010 | Hotelling et al. ............. 715/863 |
| 2002/0008691 A1 * | 1/2002 | Hanajima et al. ............. 345/173 |
| 2005/0003851 A1 | 1/2005 | Chrysochoos et al. |
| 2005/0024325 A1 | 2/2005 | Fleischmann et al. |
| 2005/0071761 A1 | 3/2005 | Kontio |
| 2005/0172734 A1 | 8/2005 | Alsio et al. |
| 2006/0026521 A1 | 2/2006 | Hotelling et al. |
| 2006/0066588 A1 | 3/2006 | Lyon et al. |

(Continued)

FOREIGN PATENT DOCUMENTS

| | | |
|---|---|---|
| KR | 10-0282099 B1 | 2/2001 |
| KR | 10-2006-0059263 A | 6/2006 |

(Continued)

*Primary Examiner* — Michael Pervan
(74) *Attorney, Agent, or Firm* — Birch, Stewart, Kolasch & Birch, LLP

(57) ABSTRACT

Disclosed are an apparatus and a method for providing various feedbacks for a proximity based systems or a 3D touchscreen. According to the embodiments, a field (or a recognition region) above a 3D touchscreen may be divided into a predetermined number of levels of sub fields and a configuration of a feedback provider or a feedback changed according to the change of the level in which an object such as a finger may be changed.

13 Claims, 17 Drawing Sheets

U.S. PATENT DOCUMENTS

| | | |
|---|---|---|
| 2007/0211031 A1 | 9/2007 | Marc |
| 2007/0242056 A1 | 10/2007 | Engelhardt et al. |
| 2007/0262964 A1 | 11/2007 | Zotov et al. |
| 2008/0046425 A1 | 2/2008 | Perski |
| 2008/0134102 A1 | 6/2008 | Movold et al. |
| 2008/0165141 A1 | 7/2008 | Christie |
| 2008/0184173 A1 | 7/2008 | Sutanto et al. |
| 2008/0238886 A1 | 10/2008 | Bengtsson et al. |
| 2008/0246723 A1 | 10/2008 | Baumbach |
| 2008/0278450 A1 | 11/2008 | Lashina |
| 2008/0284738 A1 | 11/2008 | Hovden et al. |
| 2008/0284739 A1 | 11/2008 | Andrews et al. |
| 2008/0297471 A1 | 12/2008 | Hill et al. |
| 2009/0079700 A1 | 3/2009 | Abernathy |
| 2009/0225100 A1 | 9/2009 | Lee et al. |
| 2009/0256947 A1 | 10/2009 | Ciurea et al. |
| 2009/0284482 A1 | 11/2009 | Chin |
| 2009/0327977 A1 | 12/2009 | Bachfischer et al. |
| 2010/0026723 A1 | 2/2010 | Nishihara et al. |
| 2010/0050134 A1 | 2/2010 | Clarkson |
| 2010/0162182 A1 | 6/2010 | Oh et al. |
| 2011/0041100 A1 | 2/2011 | Boillot |

FOREIGN PATENT DOCUMENTS

| | | |
|---|---|---|
| KR | 10-2006-0069985 A | 6/2006 |
| KR | 10-2006-0134119 A | 12/2006 |
| KR | 10-2007-0036077 A | 4/2007 |
| KR | 10-2007-0119094 A | 12/2007 |
| WO | WO 2006003586 A2 * | 1/2006 |
| WO | WO 2006003588 A2 * | 1/2006 |
| WO | WO-2006/094308 A2 | 9/2006 |

* cited by examiner

APPARATUS AND METHOD FOR PROVIDING FEEDBACK FOR THREE-DIMENSIONAL TOUCHSCREEN

CROSS-REFERENCE TO RELATED APPLICATIONS

The present application claims priority under 35 U.S.C. 119 to Korean Patent Application No. 10-2007-0089036 filed on Sep. 3, 2007, and Korean Patent Application No. 10-2007-0087828 filed on Aug. 30, 2007, which are hereby incorporated by reference in their entirety.

FIELD OF THE INVENTION

The embodiment relates to an apparatus and a method for providing feedback for a 3D touchscreen.

BACKGROUND

In general, a touchscreen has a screen display function as well as a user interface function. In more detail, if a user writes a character or a mark or draws a picture on a panel formed on liquid crystal of the touchscreen, a pointer of the touchscreen displays the shape of the character, mark or picture while moving along a predetermined route. Further, if a user touches an icon displayed on a screen in a specific mode, a corresponding function is performed to display a predetermined image.

Because a personal portable information appliance has many touchscreens, the personal portable information appliance provides a user with convenience in terms of information collecting, saving, writing, searching and communication functions. Although these devices work well, an improved input device and operational methods associated therewith is therefore desired.

SUMMARY

Accordingly, one embodiment of the present invention is to provide a terminal and corresponding method for providing feedback to a user according to the distance between an object, such as a finger, and a touchscreen in a 3D touchscreen capable of detecting a proximity distance as well as touch of the object.

Another object of the present invention is to provide convenience to a user by allowing the user to easily recognize the distance between an object, such as a finger, and a touchscreen, or to recognize a horizontal movement of the object with respect to the touchscreen.

To achieve these and other objects, the present invention provides in one aspect an input device including a detecting unit configured to detect an object moving with respect to the input device, and a control unit configured to determine what region among a plurality of regions above the input device the object is within with respect to the input device, and to provide feedback based on what region the object is determined to be within. The present invention also provides a corresponding method of controlling a mobile terminal.

In another aspect, the present invention provides a mobile terminal including a display including a touch input device, a detecting unit configured to detect an object moving with respect to the touch input device, and a control unit configured to determine what region among a plurality of regions above the touch input device the object is within with respect to the touch input device, and to provide feedback based on what region the object is determined to be within.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE EMBODIMENTS

Hereinafter, embodiments of the present invention will be described in more detail with reference to the accompanying drawings.

Figure 1:
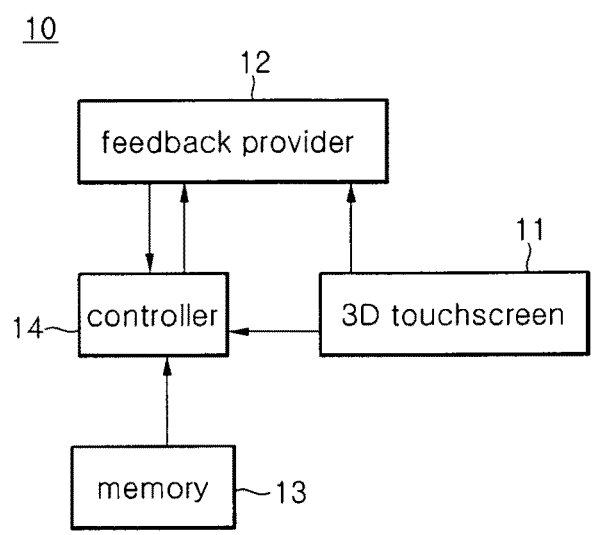
FIG. 1 is a block diagram illustrating a 3D touchscreen apparatus according to one embodiment of the present invention.

FIG. 1 is a block diagram illustrating a 3D touchscreen apparatus according to one embodiment of the present invention. Referring to FIG. 1, the 3D touchscreen apparatus according to one embodiment of the present invention includes a 3D touchscreen 11, a feedback provider 12, a memory 13 and a controller 14. The 3D touchscreen 11 detects the position and distance of an object in a recognition region. The feedback provider 12 provides a predetermined feedback corresponding to a three-dimensional coordinate of the object entering the recognition region of the 3D touchscreen 11. The memory 13 stores feedback information corresponding to the three-dimensional coordinate of the object, and the controller 14 calculates the three-dimensional coordinate of the object detected by the 3D touchscreen 11 to provide the feedback provider 12 with feedback corresponding to a depth coordinate.

Further, the 3D touchscreen apparatus according to the present invention includes all electronic apparatuses equipped with displays such as a mobile terminal (e.g. a cell phone, an MP3 player, a notebook PC, a portable game player, a game player controller and a PMP (portable multimedia player)), a non-mobile apparatus (e.g. a TV, an audio system and a monitor), and a DID (digital information display) installed in a street.

In addition, the object includes a conductor, a finger, an IR pen and an EMR pen according to a touchscreen scheme. Differently from the conventional touchscreen capable of detecting touch of an object and only the 2D coordinate, the 3D touchscreen 11 can detect the distance between the 3D touchscreen 11 and an object, and a 2D coordinate on the surface of the 3D touchscreen 11 when the object approaches the surface of the 3D touchscreen 11 in a recognition area, in addition to a 2D coordinate (XY coordinate) when the object makes contact with the surface of the 3D touchscreen 11.

According to the embodiment, a field (or a recognition region) above a 3D touchscreen may be divided into a predetermined number of levels of sub fields and a configuration of a feedback provider or a feedback changed according to the change of the level in which an object such as a finger may be changed. Alternatively, according to the embodiments, a configuration of a feedback provider of a feedback may be continuously changed as an object such as a finger approaches or gets apart from the surface of the 3D touchscreen.

In addition, the feedback provider 12 provides feedback corresponding to a depth of the object entering the recognition region of the 3D touchscreen 11, i.e. a height from the 3D touchscreen 11. One embodiment of the present invention provides a user with sound, vibration or visual feedback according to the depth of the object such that the user can recognize the depth of the object, i.e. the distance between the depth object and the surface of the 3D touchscreen 11.

Thus, the feedback provider 12 includes a sound source for generating sound, a vibrator for generation vibration, and a light source array or a backlight device such as an LED for providing visual feedback. Further, the feedback provider 12 differentially generates a feedback signal according to a depth coordinate of the object. This will be described in more detail with reference to FIGS. 2 and 3.

In addition, the memory 13 stores sound, vibration or optical signal information corresponding to the depth of the object, i.e. the height from the 3D touchscreen 11. Thus, the feedback provider 12 receives the depth coordinate of the object, which is calculated by the controller 14, to generate a feedback signal corresponding to the coordinate from among the information stored in the memory 13.

Further, the controller 14 detects the object entering the recognition region of the 3D touchscreen 11 to calculate a three-dimensional coordinate of the object, and controls the feedback provider 12 to provide feedback corresponding to the depth coordinate. When the controller 14 detects the object entering the recognition region of the 3D touchscreen 11, an unexpected object may also be detected. Thus, the controller 14 selectively must detect an object (e.g. a conductor, a finger, an IR pen and an EMR pen) entering the recognition region for substantial input. Accordingly, the controller 14 can simply ignore an object unintentionally entering the recognition region.

For example, in order to filter an object, such as a cheek or a palm, which unintentionally enters the recognition region, the area of the object is measured. When the measured area is larger than a predetermined value, the object can be ignored although the approach of the corresponding object is detected. Further, if the substantial object enters the recognition region of the 3D touchscreen 11, the controller 14 calculates the three-dimensional coordinate of the object.

In addition, the conventional touchscreen scheme requires only the 2D coordinate of an object in order to recognize a contact point, because the object is recognized only when the object makes contact with a screen. However, the 3D touchscreen must calculate the three-dimensional coordinates of the object, because it is necessary to recognize the object according to the distance between the object and the surface of a screen. Various well-known methods of calculating the three-dimensional coordinates may be used. For example, a capacitive touchscreen, an IR touchscreen, an EMR touchscreen and an ultrasonic sensor may be used.

Also, the capacitive touchscreen measures a variation in capacity between a finger or a conductor and a touchscreen sensor, and then compares the variation with a threshold value to determine if the finger or the conductor makes contact with the touchscreen sensor or the distance between the finger or the conductor and the touchscreen sensor.

Further, a panel of the capacitive touchscreen is formed by coating a charge storage material. If an object makes contact with the panel, a smaller amount of charges is attracted to a touch point. Then, circuits positioned in edges of the panel measure the charges to transmit measured information to a controller. Also, the capacitive touchscreen is not affected by external factors and has a high transparency.

In addition, the IR touchscreen includes an IR receiver positioned in the outer peripheral portion of a display device to receive IR scattered from the surface of the display device after being generated from an IR pen. The IR touchscreen calculates the position of an object from the intensity of the received IR. The EMR touchscreen measures proximity and distance using EMR between an EMR sensor plate and a dedicated pen, and the ultrasonic sensor generates ultrasonic waves on a touchscreen to detect the position and movement of an object based on the ultrasonic waves.

The present specification describes the capacitive touchscreen, the IR touchscreen, the EMR touchscreen and the ultrasonic sensor in order to calculate the three-dimensional coordinate. However, the scope of the present invention is not limited thereto. Also, after calculating the three-dimensional coordinates of the object, the controller 14 controls the feedback provider 12 to provide feedback by using sound, vibration or visual feedback corresponding to the calculated depth coordinate. The feedback provider 12 also provides sound information or vibration corresponding to the depth coordinate of the object as feedback under the control of the controller 14.

Figure 2:
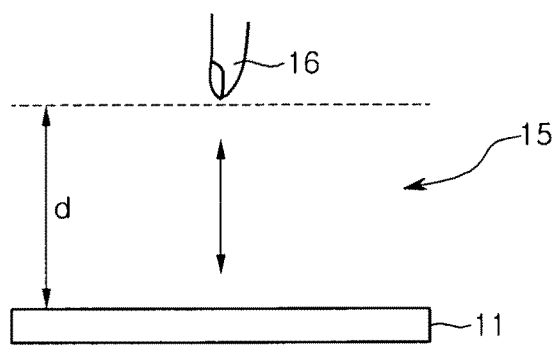
FIGS. 2 and 3 are views illustrating examples of providing sound or vibration as feedback according to one embodiment of the present invention.
Figure 3:
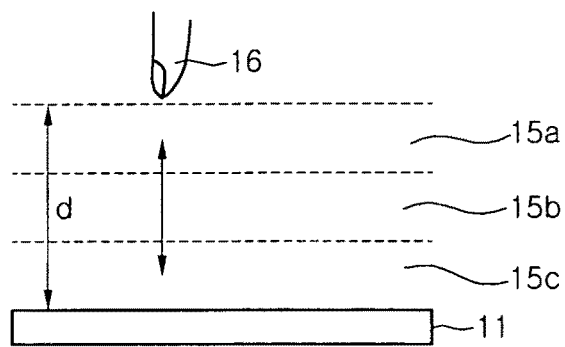

Next, FIGS. 2 and 3 are views illustrating examples of providing feedback by using sound or vibration according to one embodiment of the present invention. A predetermined sound source is used as the feedback provider 12.

As illustrated in FIG. 2, as a user vertically moves an object 16 such as a finger from an exterior of the recognition region 15, which has a distance "d" from the 3D touchscreen 11, until the object makes contact with the surface of the 3D touchscreen 11, the feedback provider 12 can output sound in proportional to the depth of the object 16 as feedback.

For example, the feedback provider 12 can start to output sound when the object 16 enters the recognition region 15, and gradually increase or decrease the intensity of the sound as the object 16 approaches the 3D touchscreen 11. Thus, the user can recognize the height from the 3D touchscreen 11 through the sound. According to another embodiment, the user can recognize the height from the 3D touchscreen 11 by varying the frequency of the sound.

According to another embodiment, a vibrator is used as the feedback provider 12. The vibrator can start to output vibration when the object 16 enters the recognition region 15, and gradually increase or decrease the frequency of the vibration as the object 16 approaches the 3D touchscreen 11. Thus, the user can recognize the height from the 3D touchscreen 11 through variation in the frequency of the vibration.

According to still another embodiment, as illustrated in FIG. 3, the recognition region 15 is divided into several sub-regions 15a to 15c, and various sounds or vibration patterns can be generated whenever the object 16 enters each sub-region of the recognition region 15. If the object 16 touches the surface of the 3D touchscreen 11, a predetermined sound or vibration having a different frequency can be generated. Thus, the user can recognize if the object 16 stays in a region of the sub-regions 15a to 15c, or if the object 16 touches the surface of the 3D touchscreen 11, by listening to a corresponding sound or feeling a corresponding vibration.

Figure 4:
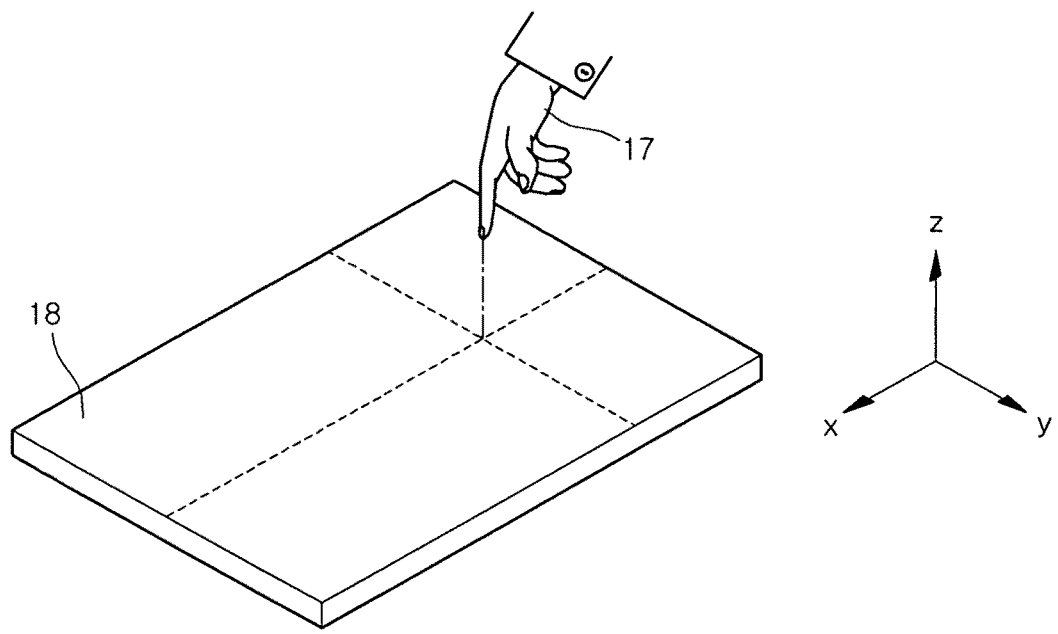
FIGS. 4 and 5 are views schematically illustrating vibration generated from a part corresponding to a horizontal coordinate value of an object according to one embodiment of the present invention.
Figure 5:
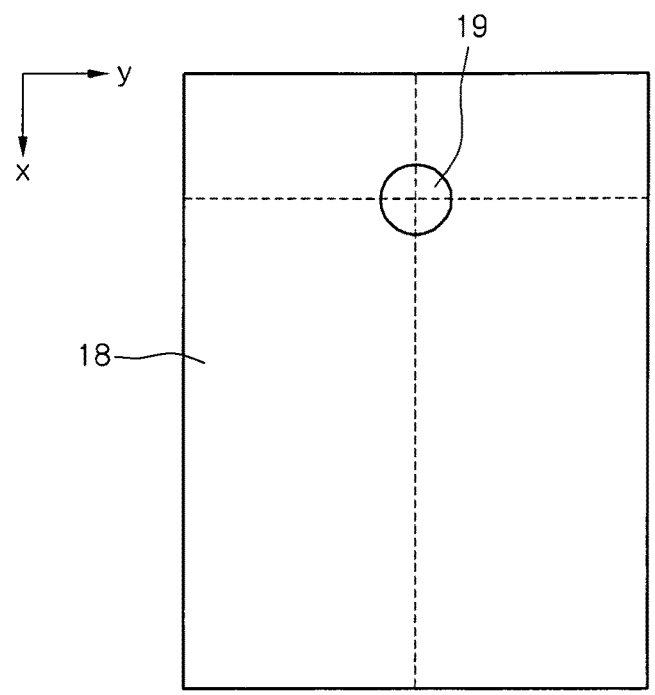

FIGS. 4 and 5 are views schematically illustrating a vibration generated from a part corresponding to a horizontal coordinate value of an object according to one embodiment of the present invention.

According to one embodiment of the present invention, when providing feedback using vibration, the vibration can be generated from a part corresponding to a 2D coordinate value (i.e. X-Y coordinate value) of an object. In more detail, referring to FIGS. 4 and 5, when the object 17 approaches a screen 18, the controller 14 calculates the three-dimensional coordinate of the object 17, i.e. the distance between the object 17 and the screen 18. At this time, the controller 14 can control the feedback provider 12 to generate a vibration at a point 19 corresponding to the 2D coordinate of the object 17.

Further, two or more vibrators can be used or one multi-channel vibrator capable of generating a vibration at various positions can be used. Thus, a user can feel three-dimensional vibration by varying the vibration direction, vibration degree, and vibration sequence of the vibrator. The vibration may also be generated from a 3D touchscreen apparatus equipped with the vibrator. Further, the vibration may also be generated by allowing the 3D touchscreen apparatus to interact with another apparatus, e.g. a joystick of an electronic game player.

In addition, various types of vibrators can be used. For example, a bar-type vibrator, a coin type vibrator and a liner vibrator can be used. The -type vibrator and the coin type vibrator generates vibration in the rotation direction of a rotating member and the liner vibrator generates vibration up and down. The liner vibrator can be used as a vibrator for feedback because it can provide feedback in realtime. Also, for realizing a three-dimensional vibration, the three types of vibrators can be used.

Hereinafter, a vibrator capable of generating a vibration at various positions according to the embodiment will be described with reference to FIGS. 6 and 7. In particular, FIG. 6 is a perspective view of a mobile terminal having a vibration generator according to one embodiment of the present invention, and FIG. 7 is a sectional view of the mobile terminal taken along line A-A' of FIG. 6.

Figure 6:
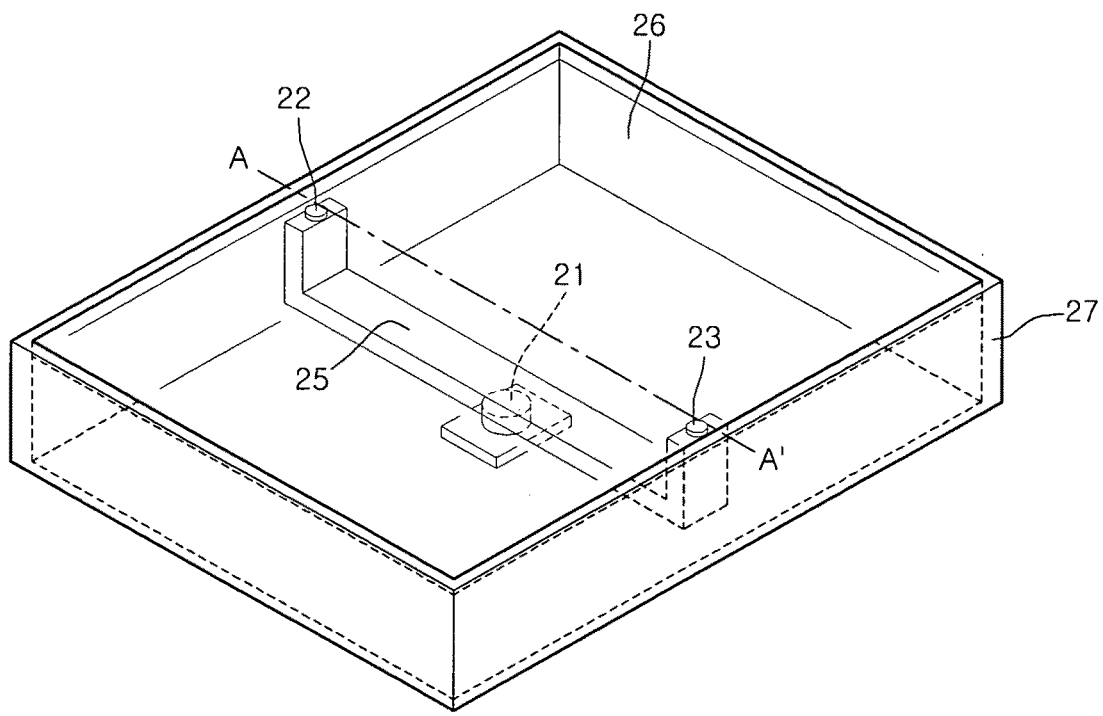
FIGS. 6 and 7 are perspective and sectional views illustrating a vibrator capable of generating vibration at various positions of a mobile terminal according to one embodiment of the present invention.
Figure 7:
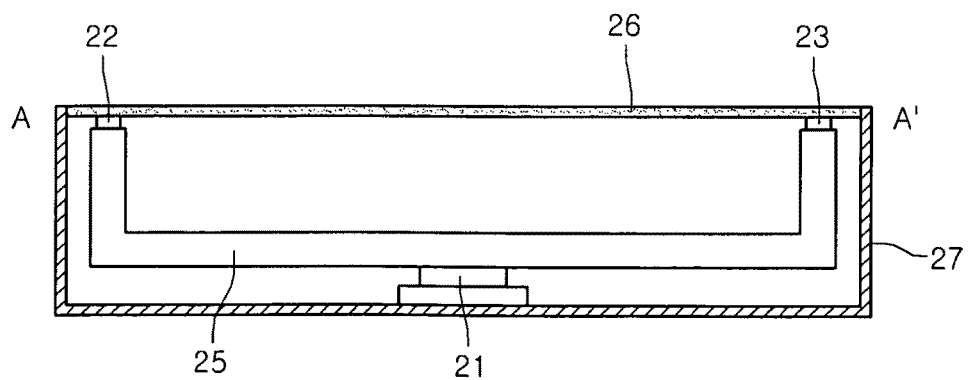

As illustrated in FIGS. 6 and 7, the mobile terminal 20 having a vibration generator according to one embodiment of the present invention includes a multi-channel vibrator 21, dummy vibrators 22 and 23, a vibration transfer unit 25, a window glass 26 and a case 27. The multi-channel vibrator 21 vibrates with at least two resonance frequencies. Further, the dummy vibrators 22 and 23 have a resonance frequency identical to one of the two resonance frequencies and vibrate by receiving a vibration from the multi-channel vibrator 21.

In addition, the vibration transfer unit 25 transfers the vibration of the multi-channel vibrator 21 to the dummy vibrators 22 and 23. The window glass 26 is connected with the dummy vibrators 22 and 23 to transfer the vibration of the dummy vibrators 22 and 23 to an exterior of the mobile terminal 20. Also, the case 27 is connected with the multi-channel vibrator 21 to transfer the vibration of the multi-channel vibrator 21 to the exterior of the mobile terminal 20.

The mobile terminal 20 having the vibrator according to one embodiment of the present invention may also include a cell phone, an MP3 player, a notebook PC, a PDA, a portable game player, a game controller, a PMP and the like. When the vibration generator is provided in the mobile terminal 20, the multi-channel vibrator 21 can be connected with the case 27 of the mobile terminal 20. In such an instance, the vibration generated from the multi-channel vibrator 21 is transferred to the exterior of the mobile terminal 20 through the case 27, and can be transferred to a user using the mobile terminal 20. Because the multi-channel vibrator 21 is connected with the case 27 to transfer the vibration, the vibration can be transferred over the whole area of the mobile terminal 20.

According to one embodiment of the present invention, the dummy vibrators 22 and 23 are connected with the window glass 26 of the mobile terminal 20 to transfer the vibration to the exterior of the mobile terminal 20 through the window glass 26. In such an instance, the dummy vibrators 22 and 23 transfer the vibration only to a part of the window glass 26 connected to the dummy vibrators 22 and 23. According to the embodiment, an area of the window glass 26 receiving the vibration can be adjusted by controlling the vibration intensity of the dummy vibrators 22 and 23. In addition, the dummy vibrators 22 and 23 are provided in the mobile terminal 20 to transfer the vibration to plural areas of the window glass 26.

FIG. 6 shows the vibration transfer unit 25 spaced apart from the multi-channel vibrator 21 and the dummy vibrators 22 and 23 at a predetermined interval. As shown, the vibration transfer unit 25 has a substantially C shape. According to another embodiment, the vibration transfer unit 25 may have a semicircular shape or other shapes. Also, an absorption rate of the dummy vibrators 22 and 23 absorbing the vibration of the multi-channel vibrator 21 may vary depending on material, weight and shape of the vibration transfer unit 25.

Preferably, it is designed to obtain a maximum difference between resonance frequencies of the vibration transfer unit and the dummy vibrators 22 and 23. Further, to transfer the vibration of the multi-channel vibrator 21 to the dummy vibrators 22 and 23 without loss, it is preferably designed to minimize the vibration of the vibration transfer unit 25.

Also, when the vibration frequency of the multi-channel vibrator 21 is identical to the vibration frequency of the dummy vibrators 22 and 23, the dummy vibrators 22 and 23 can absorb the vibration of the multi-channel vibrator 21 through the vibration transfer unit 25. In such a case, the mobile terminal 20 may be locally vibrated by the dummy vibrators 22 and 23 without being wholly vibrated by the multi-channel vibrator 21. According to the embodiment, a ratio of the whole vibration to the local vibration may be changed by adjusting the absorption rate.

As illustrated in FIG. 7, the multi-channel vibrator 21 according to one embodiment of the present invention can be connected with the case 27 of the mobile terminal 20 and the dummy vibrators 22 and 23 can be connected with the window glass 26 of the mobile terminal 20. Further, the vibration transfer unit 25 is connected between the multi-channel vibrator 21 and the dummy vibrators 22 and 23 to transfer the vibration of the multi-channel vibrator 21 to the dummy vibrators 22 and 23. The mobile terminal 20 as illustrated in FIG. 6 generates vibration at various areas by the multi-channel vibrator 21 and the dummy vibrators 22 and 23, so that a user can detect the vibration at the various areas of the mobile terminal 20.

According to an embodiment, the present invention provides feedback using the sound information or vibration. However, the scope of the present invention is not limited thereto. That is, various mediums can be utilized to provide feedback.

Figure 8:
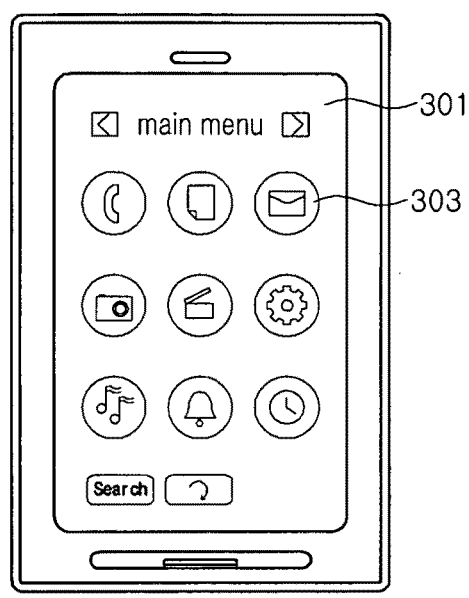
FIGS. 8 to 11 are views illustrating a method for providing a user with feedback through a display of a mobile terminal according to one embodiment of the present invention.

Next, FIGS. 8 to 11 are views illustrating a method for providing a user with visual feedback through a display of a mobile terminal according to one embodiment of the present invention. In particular, FIG. 8 shows a state in which a main menu is displayed on a display of a so-called full touch screen phone according to one embodiment of the present invention. The full touch screen phone 300 has a touchscreen 301 mounted on a display having a relatively wide area, instead of phone number input buttons. When the full touch screen phone 300 is powered on, a phone number is input through the touchscreen 301.

In addition, the full touch screen phone 300 of FIG. 8 can detect proximity or a proximate distance of an object as well as touch input of a user by using one of the aforementioned 3D touch schemes such as the capacitive touchscreen, the IR touchscreen, the EMR touchscreen and the ultrasonic sensor.

Figure 9:
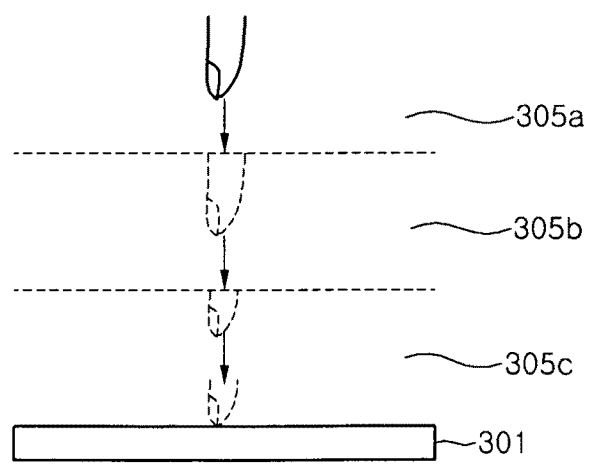

In the state in which the main menu is displayed as illustrated in FIG. 8, as an object (e.g. finger) of a user approaches the touchscreen 301 as illustrated in FIG. 9, a menu corresponding to a two-dimensional position of the object, e.g. the configuration of a graphic object (an icon 303) of a text message, is visually changed. For example, the size of the icon 303 can be changed or highlighted.

Figure 10:
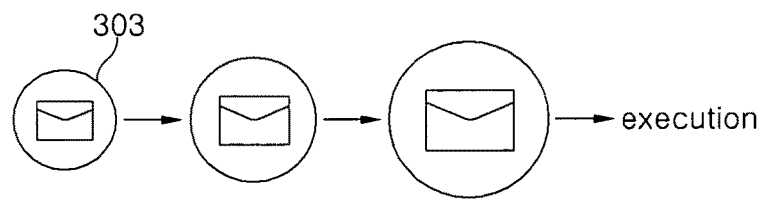

When the finger is positioned at the outside 305a of a recognition region of the touchscreen 301 as illustrated in FIG. 9, the icon 303 of the text message has no change. However, as the finger enters the first and second regions 305b and 305c, the icon 303 is can be expanded step by step as illustrated in FIG. 10. Then, if the finger touches the touchscreen 301, the text message menu can be executed.

Figure 11:
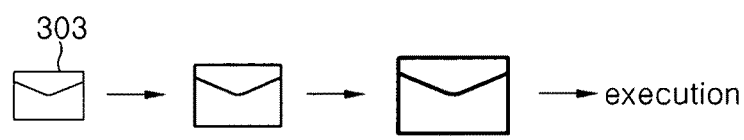

According to another embodiment, as the finger approaches the touchscreen 301 from the outside 305a of the recognition region, the outline of the icon 303 can be gradually thickened and highlighted as illustrated in FIG. 11. Similarly, if the finger touches the touchscreen 301, the text message menu can be executed. Thus, the user can recognize the distance between the finger and the touchscreen 301 according to variation in the icon 303 as illustrated in FIGS. 10 and 11.

Figure 12:
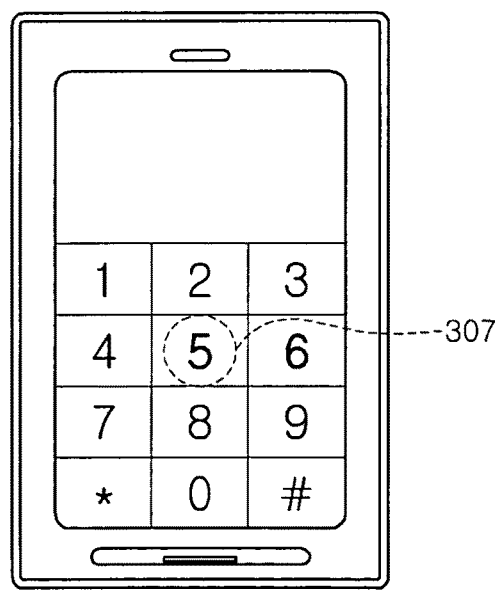
FIGS. 12 to 15 are views illustrating a method for providing visual feedback such that a user can recognize two and three-dimensional positions of a finger of an object relative to a touchscreen according to one embodiment of the present invention.

Next, FIGS. 12 to 15 are views illustrating a method for providing visual feedback such that a user can recognize two and three-dimensional positions of the finger of the object relative to the touchscreen according to one embodiment of the present invention. In particular, FIG. 12 shows a state in which keypads are displayed on the mobile terminal 300. In FIG. 12, it is assumed that the finger or object is positioned in a space corresponding to a dotted part 307.

Figure 13:
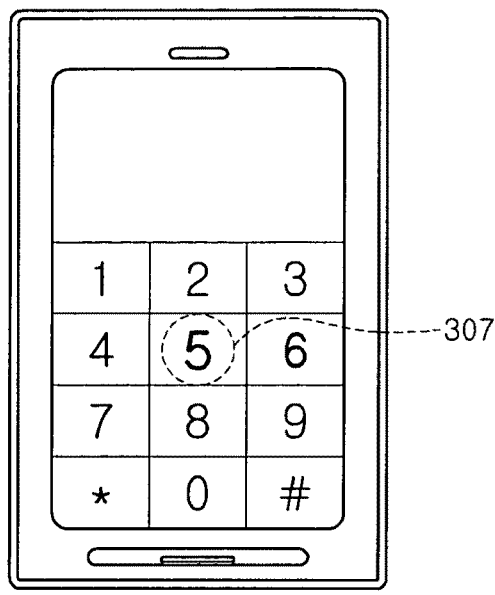

When the finger or object is positioned at the outside 305a of the recognition region of the touchscreen 301 as illustrated in FIG. 9, all keypads are displayed with the same size. When the finger or object is positioned in the first region 305b of the touchscreen 301 as illustrated in FIG. 9, the part 307 corresponding to the position of the finger is expanded as illustrated in FIG. 13. Also, when the finger or object is positioned in the second region 305c of the touchscreen 301 as illustrated in FIG. 9, the configuration of the graphic object of the part 307 corresponding to the position of the finger can be changed.

Figure 14:
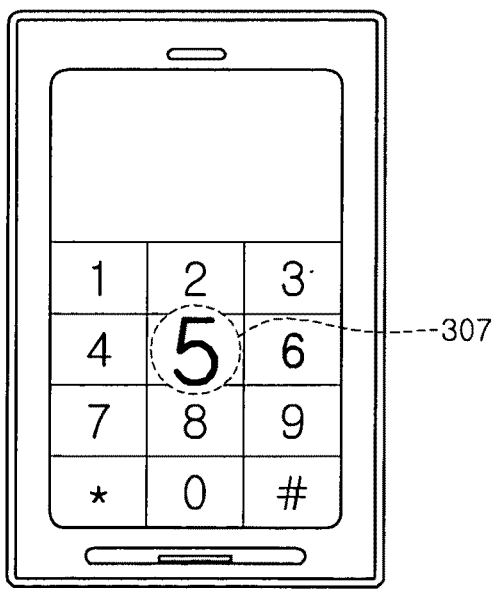

For example, as illustrated in FIG. 14, the part 307 corresponding to the position of the finger can be expanded. According to another embodiment, the part 307 may be displayed as if the part 307 protrudes or is seen as a three-dimensional object. In addition, other graphic effects may also be added. Thus, the user can recognize the distance between the finger and the touchscreen 301 according to the degree of expansion of the part 307 corresponding to the position of the finger.

Figure 15:
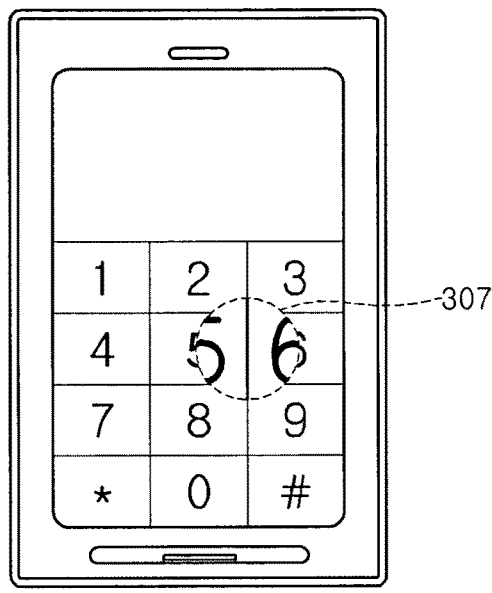

In a state as illustrated in FIG. 14, if the user moves the finger in parallel to the touchscreen 301, e.g. if the user moves the finger toward the keypad 6, the part 307 is expanded and displayed as illustrated in FIG. 15. In more detail, as the finger of the user or the object two-dimensionally moves, the expanded part 307 also moves. Thus, the user can recognize the two-dimensional position of the finger and the distance between the finger and the touchscreen 301 according to the visual feedback, i.e. the expansion degree and position of the part 307 corresponding to the position of the finger.

Figure 16:
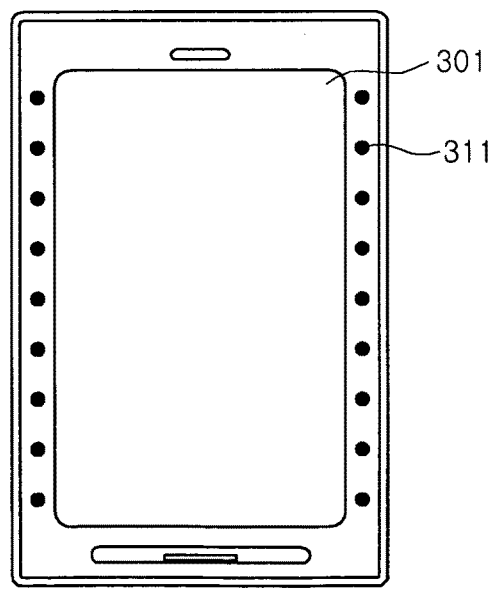
FIGS. 16 and 17 are views illustrating a method for providing a user with feedback according to the distance between an object and a screen of a mobile terminal by using a plurality of LEDs (light emitting devices) mounted around a mobile terminal according to one embodiment of the present invention.
Figure 17:
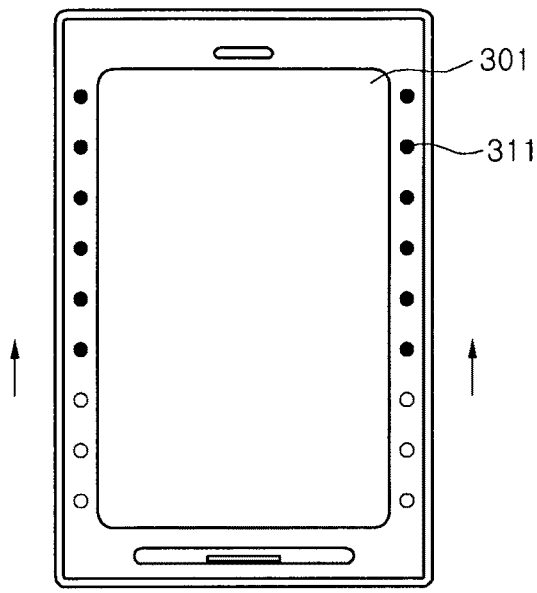

FIGS. 16 and 17 are views illustrating a method for providing a user with feedback according to the distance between the object and the screen of the mobile terminal by using a plurality of LEDs (light emitting devices) mounted at the peripheral portion of the mobile terminal according to one embodiment of the present invention.

As illustrated in FIG. 16, the LEDs 311 or an array of the LEDs 311 can be mounted on a bezel or lateral side of the touchscreen 301 of the mobile terminal 300. Preferably, the LEDs 311 can be arranged in a row in the longitudinal direction of the mobile terminal 300, and the same number of the LEDs 311 can be arranged at both sides of the mobile terminal 300 at the same interval. FIG. 16 shows a state in which the LEDs 311 are arranged only at both sides of the bezel of the mobile terminal 300. However, according to another embodiment, the LEDs 311 may also be arranged over the bezel or all sides of the mobile terminal 300.

When the finger is positioned at the outside 305a of the recognition region of the touchscreen 301 as illustrated in FIG. 9, no change occurs in the LEDs 311 as illustrated in FIG. 16. When the finger is positioned in the first and second region 305b and 305c of FIG. 9, the brightness of a predetermined number of the LEDs 311 is changed step by step from the lower portion of the mobile terminal 300. For example, the LEDs 311 may be turned on in a state in which the LEDs 311 are turned off. Then, if the finger touches the surface of touchscreen 301, the text message menu can be executed. Thus, the user can recognize the distance between the finger or the object and the touchscreen 301 according to the number of LEDs 311 having changed brightness from among all LEDs 311.

Figure 18:
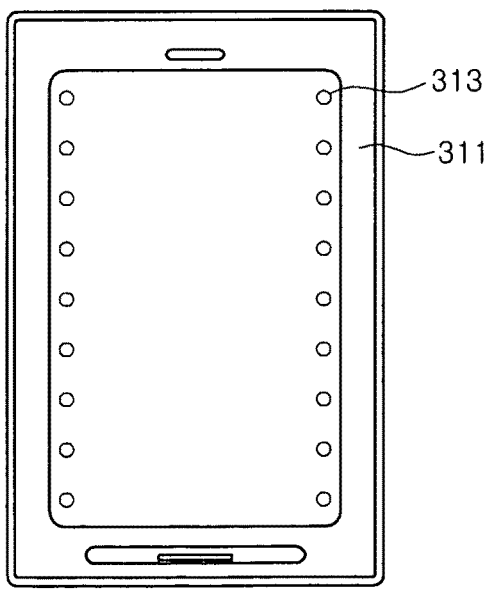
FIG. 18 is a view illustrating a method for providing a user with feedback by changing a display type of a graphic object, which is prepared in the form of an LED, according to variation in the distance between a touchscreen and an object according to one embodiment of the present invention.

Next, FIG. 18 is a view illustrating a method for providing a user with visual feedback by changing a display type of the graphic object, which is prepared in the form of an LED, according to a variation in the distance between the touchscreen and the object according to one embodiment of the present invention. In particular, FIG. 18 shows graphic objects 313 having an LED shape on the touchscreen, instead of the LEDs 311 shown in FIG. 16. Some of the graphic objects 313 can be configured to have a brightness changed step by step as the finger of a user or an object approaches the touchscreen 301 from the outside of the recognition region of the touchscreen 301.

Figure 19:
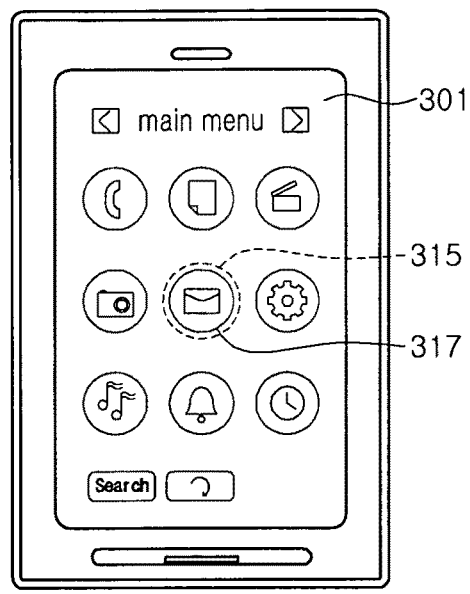
FIGS. 19 and 20 are views illustrating a method for providing a user with feedback by manipulating a backlight and a graphic object according to variation the distance between a touchscreen and an object according to one embodiment of the present invention.
Figure 20:
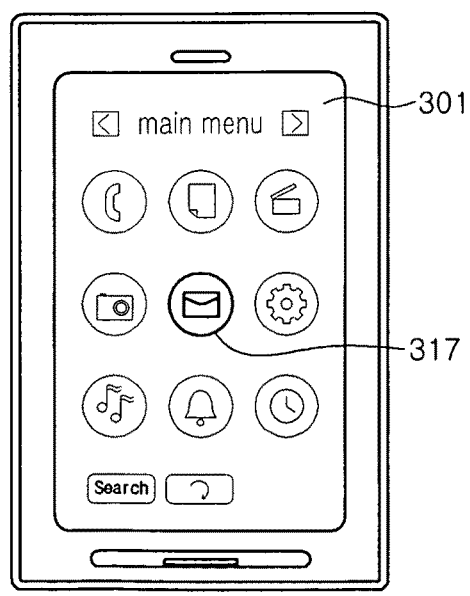

FIGS. 19 and 20 are views illustrating a method for providing a user with feedback by manipulating a backlight and a graphic object according to variation the distance between a touchscreen and the object, i.e. variation in the three-dimensional coordinate of the object, according to one embodiment of the present invention. In particular, FIG. 19 shows a state in which the main menu is displayed on a display of the mobile terminal 300, e.g. a full touch cell phone.

A dotted part 315 represents the position of the finger or the object entering the recognition region of the touchscreen 301. In FIG. 19, a plurality of icons corresponding to each menu are displayed on the main menu of the mobile terminal 300, and the finger of the user is positioned on a text message icon 317. Further, it is assumed that the finger is positioned in the first region 305b.

In the state of FIG. 19, if the user enters the second region 305c adjacent to the touchscreen 301, the icon 317 corresponding to the position 315 of the finger relatively becomes bright as compared to other parts, and remaining icons become dark. In addition, a method of brightly displaying a part of the display may use the following methods.

According to one embodiment of the present invention, if the finger of the user approaches the touchscreen 301, the backlight of the mobile terminal 300 becomes dark. If the graphic object constituting the icon 317 is replaced with another graphic object having higher brightness, only the icon 317 can be brightly displayed. According to another embodiment, if the finger of the user approaches the touchscreen 301, the brightness, contrast or a gamma value of the graphic object constituting the icon 317 is increased as compared to other parts, so that only the icon 317 can be brightly displayed.

Figure 21:
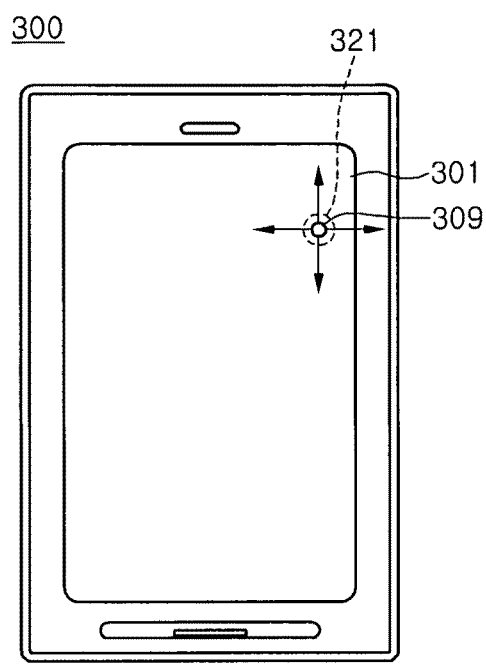
FIGS. 21 to 23 are views illustrating a method for providing a user with feedback by using a pointer on a display according to the distance between an object such as a finger and a screen of a mobile terminal according to one embodiment of the present invention.
Figure 22:
Figure 23:
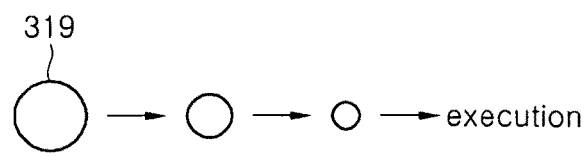

Next, FIGS. 21 to 23 are views illustrating a method for providing a user with feedback by using a pointer on the display according to the distance between the object such as the finger and the screen of the mobile terminal according to one embodiment of the present invention. As illustrated in FIG. 21, the pointer 319 can be displayed in a position 321 on the touchscreen 301 of the mobile terminal 300 corresponding to the two dimensional position of the object such as the finger of the user or a stylus pen. According to another embodiment, the pointer 319 may be displayed in the vicinity of the two dimensional position of the object.

For example, the pointer 319 may be displayed at a region which is offset in the upward direction from the two dimensional position of the object. In more detail, the offset is provided between the two dimensional position of the object and the display position of the pointer 319, so that the pointer 319 can be prevented from being hidden by the finger of the user.

Further, the dotted line representing the position 321 of the object may or may not be displayed according to another embodiment. The pointer 319 is displayed at the position 321 of the object using dots. If the user moves the object in parallel to the touchscreen 301 of the mobile terminal 300, the pointer 319 also moves in parallel to the touchscreen 301.

If the finger of the user approaches the touchscreen 301 from the outside 305a of the recognition region as illustrated in FIG. 9, the size of the pointer 319 can be increased step by step as illustrated in FIG. 22. If the object touches the surface of the touchscreen 301, a corresponding icon can be configured to be selected or executed.

According to another embodiment, if the finger approaches the touchscreen 301 from the outside 305a of the recognition region, the size of the pointer 319 can be increased step by step as illustrated in FIG. 23. If the object makes contact with the surface of the touchscreen 301, a corresponding icon can be configured to be selected or executed.

Figure 24:
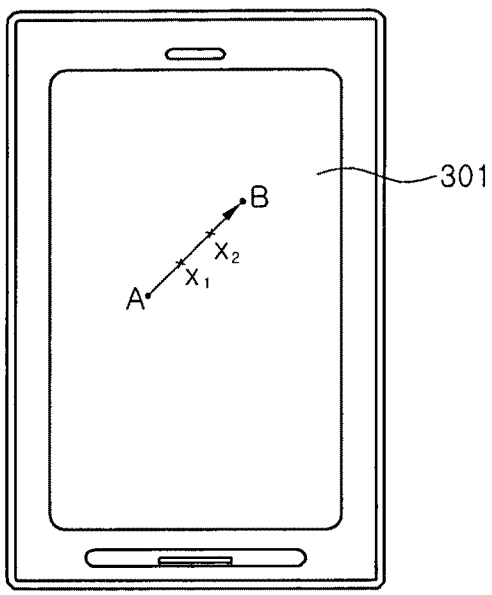
FIG. 24 is a view illustrating a method for providing a user with feedback according to movement when an object such as a finger is horizontally shifted relative to a touchscreen according to one embodiment of the present invention.

FIG. 24 is a view illustrating a method for providing a user with feedback according to movement when an object such as a finger is horizontally shifted relative to the touchscreen within the recognition region according to one embodiment of the present invention. This embodiment assumes that the finger of the user is positioned in the first region 305b or the second region 305c of the recognition region of the touchscreen 301 shown in FIG. 9.

If the user horizontally moves the finger from the point A to the point B, a vibration can be generated along the movement path at a predetermined interval. For example, assuming the user has linearly moved the finger from the point A to the point B, a region between the point A to the point B is divided into three sub-regions and a vibration can be sequentially generated from the start point to the arrival point, i.e. four points A, x1, x2 and B. In order to generate a vibration at a specific point on the display, the method described with reference to FIGS. 4 to 7 can be used.

Figure 25:
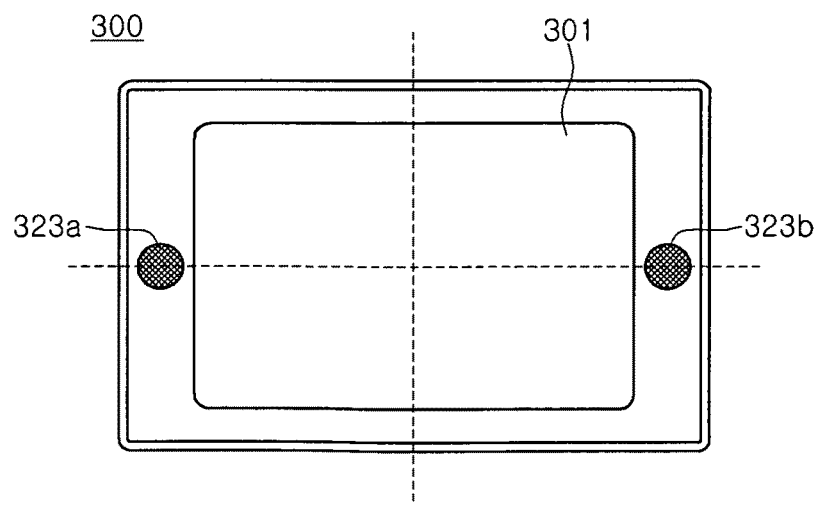
FIG. 25 is a view illustrating a method for providing a user with sound as feedback according to movement when an object such as a finger is horizontally shifted relative to a touchscreen according to one embodiment of the present invention.

FIG. 25 is a view illustrating a method for providing a user with feedback by using sound according to a movement when an object such as a finger is horizontally shifted relative to the touchscreen within the recognition region according to one embodiment of the present invention. As illustrated in FIG. 25, a pair of stereo speakers 323a and 323b are mounted on both sides of the mobile terminal 300. This embodiment assumes the finger of the user is positioned in the first region 305b or the second region 305c of the recognition region of the touchscreen 301 shown in FIG. 9. If the finger is positioned on the center line 325 of the stereo speakers 323a and 323b, the same effect sound is output from the stereo speakers 323a and 323b with the same intensity. At this time, a certain sound can be used as the effect sound.

If the user horizontally moves the finger relative to the touchscreen 301, an output of the stereo speakers 323a and 323b varies depending on the distance between the finger and the stereo speakers 323a and 323b. For example, if the finger moves toward the stereo speaker 323a, the output of the stereo speaker 323a is increased and the output of the stereo speaker 323b is reduced. However, if the finger moves toward the stereo speaker 323b, the output of the stereo speaker 323a is reduced and the output of the stereo speaker 323b is increased. As described above, the user can listen sound as feedback according to horizontal movement with respect to the touchscreen 301.

According to the embodiment as described above, the feedback can be provided according to the horizontal movement of the object. In addition to the vibration point and the output of the speaker, a vibration pattern or the frequency of sound output from the speaker is properly adjusted, so that variation in acceleration of the object can be reflected in the feedback.

The embodiments as described above describe the methods of providing the feedback according to the vertical and horizontal movements of the object relative to the touchscreen 301. These methods are properly combined to provide the user with feedback according to the movements of the object such as the finger on the three dimensional space.

Figure 26:
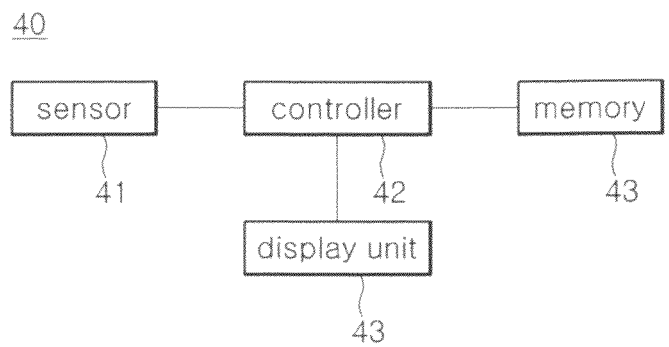
FIG. 26 is a block diagram illustrating the configuration of a mobile terminal according to an embodiment of the present invention.

FIG. 26 is a block diagram illustrating the configuration of a mobile terminal according to an embodiment of the present invention. The mobile terminal 40 according to the embodiment of the present invention includes a sensor 41, a controller 42, a memory 43 and a display unit 44. The sensor 41 detects an object approaching the touchscreen to calculate a three dimensional position of the object. In more detail, the sensor 41 detects the object approaching the touchscreen to transmit a detection signal to the controller 42.

The object for menu selection corresponds to an object approaching the touchscreen when a user executes a menu. In general, the finger of the user can be used as the object, and a pen or other devices can be used as the object. Further, the sensor 41 calculates the three dimensional position of the object approaching the touchscreen. In more detail, when the object approaches toward the touchscreen, the sensor 41 recognizes the position of the object using a (x, y and z) coordinate on the x, y and z axes. At this time, a surface parallel to the touchscreen will be referred to as a (x,y) plane and an axis vertical to the touchscreen will be referred to as a z axis.

A method by which the sensor 41 determines the three dimensional position of the object approaching the touchscreen can use the capacitive touchscreen, the IR touchscreen, the EMR touchscreen and the ultrasonic sensor. Then, the sensor 41 provides the controller 42 with the three dimensional position of the object. In addition, the controller 42 determines display, searching and execution of a menu according to the three dimensional position of the object received from the sensor 41, and provides the determination result to the display unit 44. Further, the controller 42 determines if the object transmitted from the sensor 41 is an object for menu selection.

Also, the display unit 44 displays the menu under the control of the controller 42, and the memory 43 stores each menu, the first region and the second region. The controller 42 also determines the display, searching and execution of the menu according to database stored in the memory 43.

Figure 27:
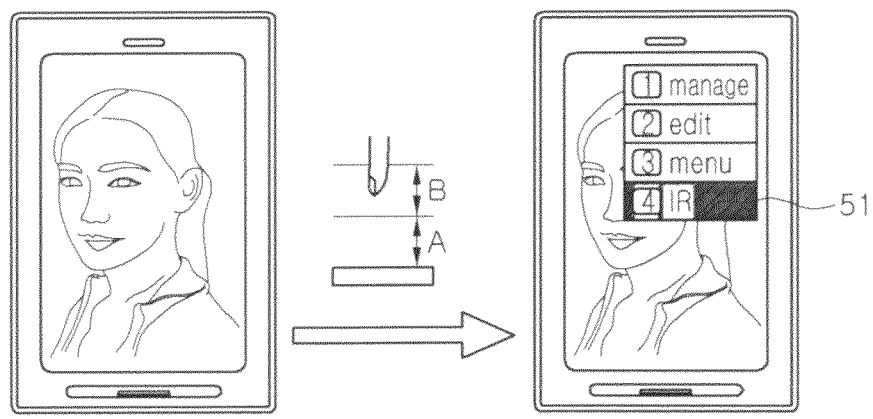
FIGS. 27 to 29 are views illustrating a method of displaying, selecting and executing a menu according to approach distance according to an embodiment of the present invention.
Figure 28:
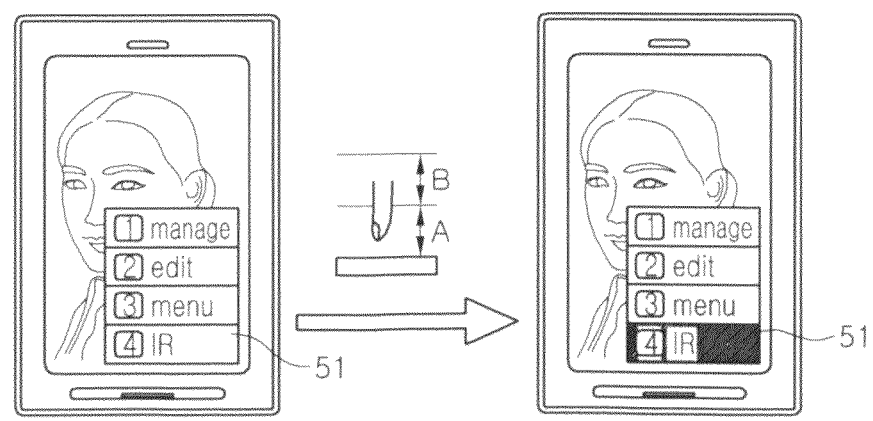
Figure 29:
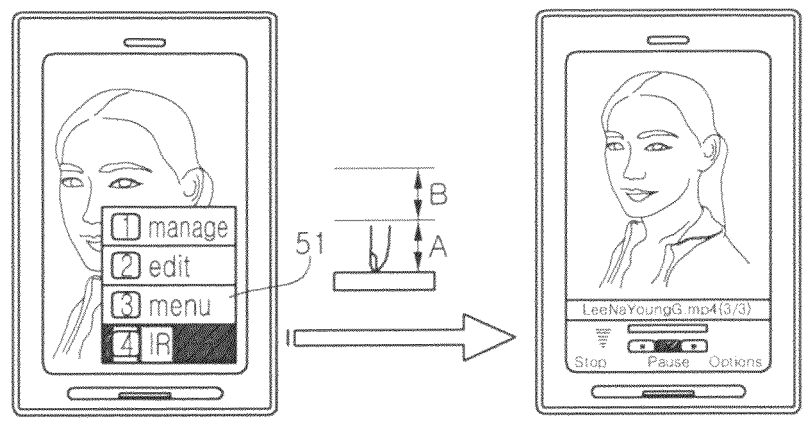
Figure 30:
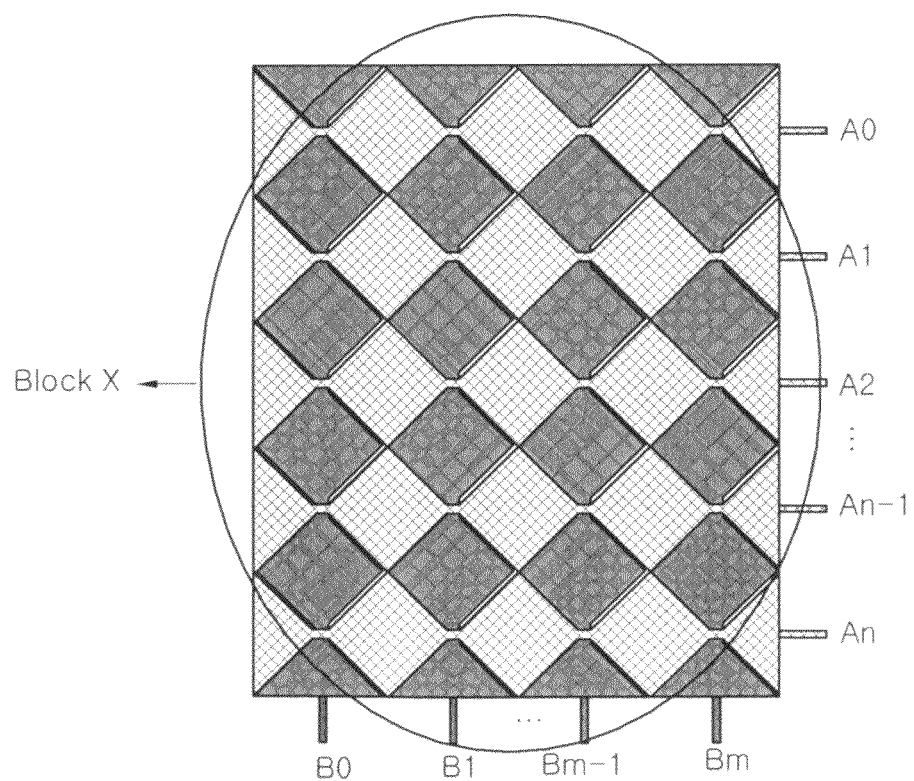
FIGS. 30 and 31 are views illustrating a method of dynamically adjusting the sensitivity of a 3D touchscreen according to one embodiment of the present invention.

FIGS. 27 to 29 are views illustrating a method of selecting and executing a menu according to approach distance according to an embodiment of the present invention. In particular, FIG. 27 shows a state in which a menu window 51 is displayed when the object enters the first region B, FIG. 28 shows a state in which the user search for a menu when the object enters the second region A, and FIG. 29 shows a state in which the menu is selected and executed when the object makes contact with the touchscreen.

Also, the second region A refers to a predetermined space formed above the surface of the touchscreen, that is, the second region corresponds to the second region 305c of FIG. 9. The first region B refers to a space formed above the second region, that is, the second region corresponds to the first region 305b of FIG. 9.

As illustrated in FIGS. 27 to 29, the first region B can be positioned adjacent to the second region A. Further, a buffer region can be formed between the first region B and the second region A to definitely divide the two regions A and B. In addition, the buffer region can also be formed between the surface of the touchscreen and the second region A.

The height of the first and second regions B and A and stacking relation with the buffer region can be variously set according to embodiments, and the set value is stored in the memory 43 as a database and then is used to perform the display, searching and execution steps of the menu under the control of the controller 42.

Further, FIG. 27 shows a state in which the menu window 51 is displayed when the object enters the first region B. If the object enters the first region B, the sensor 41 detects the object to calculate the three-dimensional position thereof, and provides the three-dimensional position the controller 42. Because the object enters the first region B in FIG. 27, the menu window 51 is displayed by the display unit 44. The display of the menu window 51 varies depending on the z coordinate of the three-dimensional position of the object.

According to another embodiment, the displayed menu window 51 can be shifted to a position corresponding to the object. In more detail, if the object is shifted in parallel to the touchscreen from the first region B, the menu window 51 can be displayed on the position corresponding to the object. In such a case, the position of the menu window 51 varies depending on positions corresponding to the (x and y) coordinate of the object.

If the object enters the second region A as illustrated in FIG. 28, the sensor 41 detects the object to calculate the three-dimensional position thereof, and provides the three-dimensional position the controller 42. After receiving the three-dimensional position, the controller 42 compares the three-dimensional position with the database stored in the memory 43 to determine whether to perform the display, searching and execution of the menu.

Also, because the object has entered the second region A in FIG. 28, a menu is selected according to the preset database of the memory 43. If the object enters the second region A, the menu window 51 is fixed to a part set when the object enters the second region A, and the user can search for a menu while moving the object in the horizontal direction at the height corresponding to the second region A.

Next, FIG. 29 shows a state in which the menu is selected and executed when the object makes contact with the touchscreen. As shown, in a state in which the menu is searched in the second region A, if the user vertically moves the object relative to the touchscreen to touch the corresponding menu, the corresponding menu is selected and executed. Thus, if the object makes contact with the corresponding menu, the sensor 41 detects the contact and transmits a contact detection signal to the controller 42. Then, the controller 42 executes the corresponding menu and the display unit 44 displays the corresponding menu.

Meanwhile, from among the schemes for detecting the three dimensional touch as described above, the capacitive touchscreen is classified into a one-layer scheme having one transparent conductive layer and a multilayer scheme having two or more transparent conductive layers. The one-layer scheme can exactly detect an object in a non-touch region as compared to the multilayer scheme. However, exactly calculating the (x and y) coordinates of the approaching object is very difficult. Accordingly, the one-layer scheme detects the (x and y) coordinates when the touch is performed and detects the degree of approach of the object when the touch is not performed, instead of being applied to the 3D touchscreen.

In the multilayer scheme, a non-touch can be detected by utilizing the z axis while maintaining the (x and y) coordinates. However, the vertical distance sufficient for detecting the object, i.e. the z axis coordinate, varies depending on a pattern area of the sensor 41. If the pattern area of the sensor 41 is increased, the detection distance of the z axis for detecting the object is also increased. However, the resolution of the two-dimensional coordinates used for calculating the exact (x and y) coordinates of the object is degraded. Thus, the reliability for the position of the object may be reduced.

A sensing area is changed according to the degree of approach of the object relative to the touchscreen, so that the detection distance and resolution of the touchscreen can be optimized to detect the object, and thus the sensing efficiency can be improved. When the object is far away from the touchscreen, i.e., when the object is not detected in a predetermined threshold region, all touch sensors $A_0$ to $A_n$ and $B_0$ to $B_m$ constituting the touchscreen are interconnected to realize the entire area of the touchscreen as the sensing area (e.g. Block X), so that the detection distance for detecting the object approaching the touchscreen can be maximized.

Figure 31:
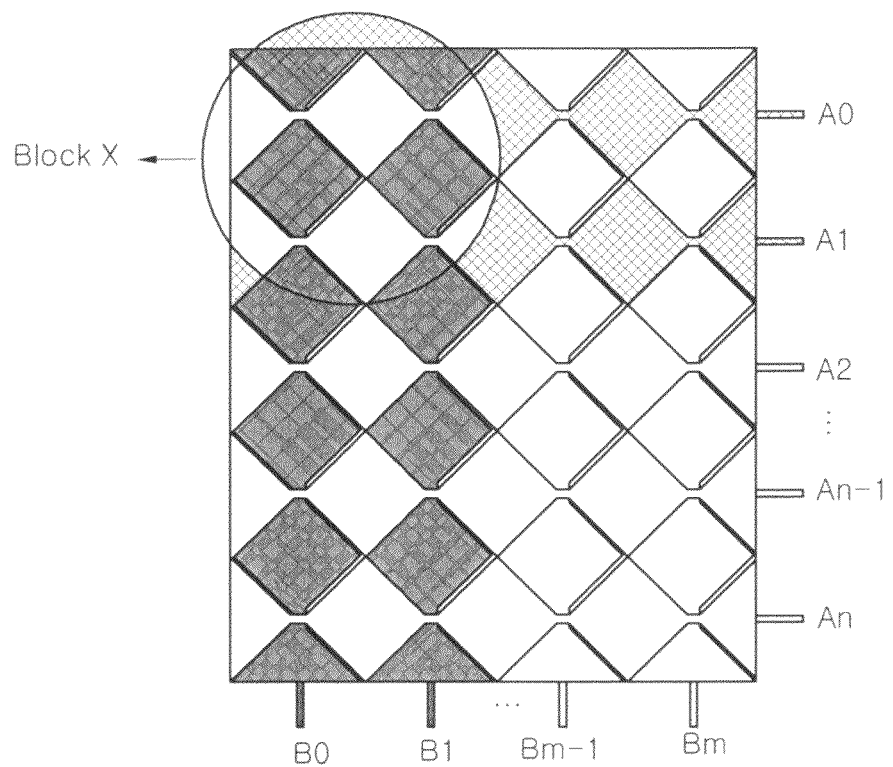

Further, when the object makes contact with the touchscreen, a plurality of touch sensor pins are connected with internal bus pins in a one-to-one manner, so that the sensing area is minimized to exactly detect a coordinate of the object, and the resolution is maximized. For example, the controller 42 releases the interconnection of the touch sensors as the object approaches the touchscreen, connects the touch sensors $A_0$ and $A_1$ with the touch sensors $B_0$ and $B_1$ perpendicular to the touch sensors $A_0$ and $A_1$ such that the sensing area is changed into a predetermined block (e.g. Block Y) through interconnection of adjacent touch sensors as illustrated in FIG. 31. Then, the controller 42 connects the touch sensors $A_1$ and $A_2$ with the touch sensors $B_0$ and $B_1$ to shift the sensing area downward, or connects the touch sensors $B_0$ and $B_1$ with the touch sensors $A_0$ and $A_1$ perpendicular to the touch sensors $B_0$ and $B_1$ and connects the touch sensors $B_1$ and $B_2$ with the touch sensors $A_0$ and $A_1$ perpendicular to the touch sensors $B_1$ and $B_2$ to shift the sensing area rightward.

In more detail, the sensing area can be shifted by sequentially turning on/off the switches such that the adjacent touch sensors are interconnected based on the block size thereof, and the shift direction can be changed from the sensing start position in up, down, right and left directions based on $A_{n\pm1}$ and $B_{m\pm1}$. At this time, if the object makes contact with the touchscreen, the touch sensor pins are connected with the internal bus pins in a one-to-one manner, so that the coordinates at which the object makes contact with the touchscreen can be exactly detected.

Further, if the sensing area of the touchscreen is changed in a block unit, the detection distance is increased, so that a contact coordinate can be estimated in advance according to movement of the object, and a response speed for executing an operation corresponding to the contact coordinate can be improved.

In all the embodiments and examples, various methods and steps discussed in this specification and/or shown in the figures are implementable in any suitable device including various mobile devices discussed in the specification and/or shown in the figures. Further, such methods and steps are implementable using hardware and/or software.

Figure 32:
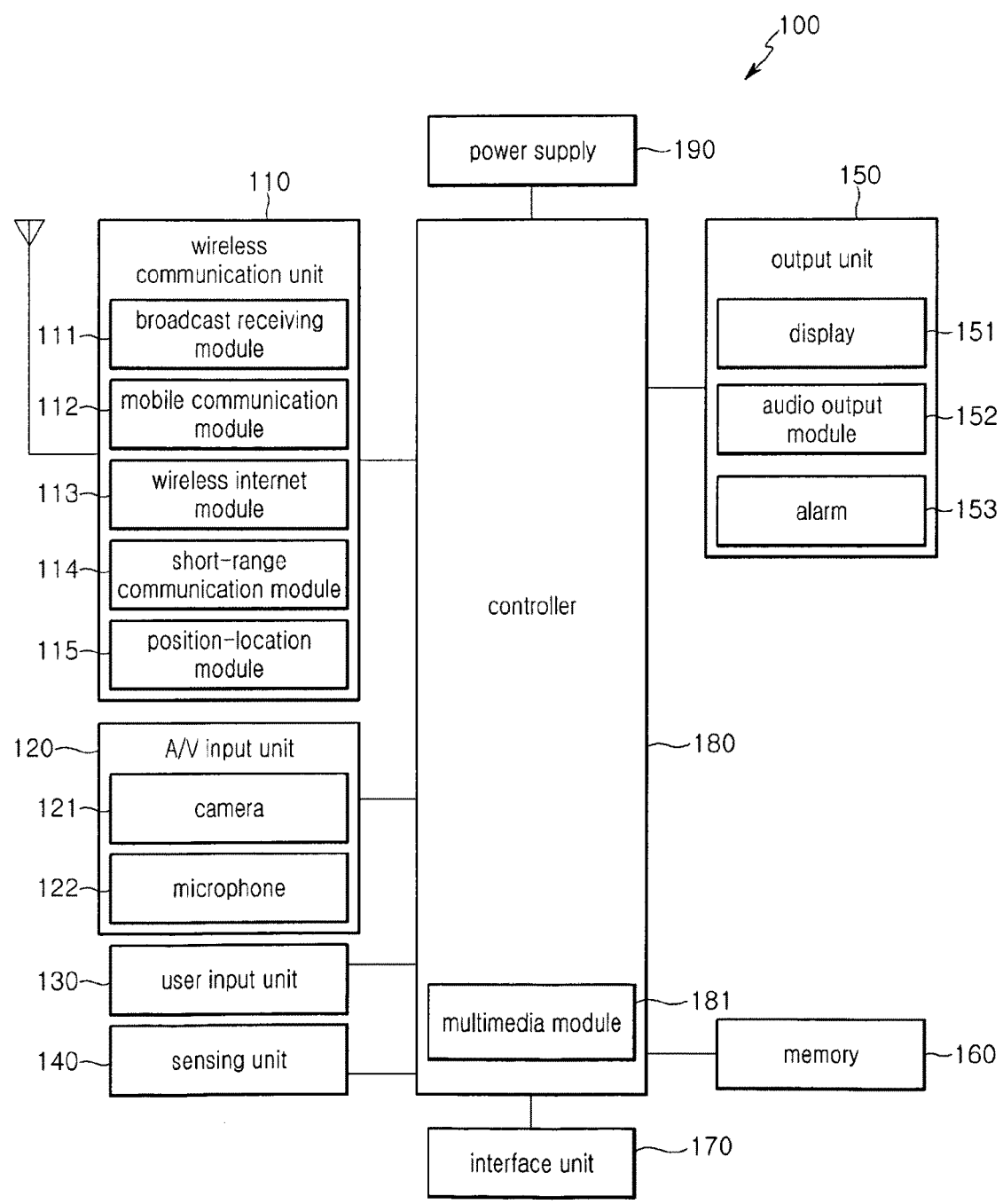
FIG. 32 is a block diagram illustrating a mobile terminal according to one embodiment of the present invention.

FIG. 32 is a block diagram of a mobile device 100 in accordance with an embodiment of the present invention. Any mobile device (e.g., mobile device 10, 20, 300 etc.) discussed in the specification can be the mobile device 100 with all of the parts or some of the parts including a distance sensor. As discussed above, the mobile device in the present invention may be implemented using a variety of different types of devices. Examples of such devices include mobile phones, user equipment, smart phones, computers, digital broadcast devices, personal digital assistants, portable multimedia players (PMP) and navigators. By way of non-limiting example only, further description will be with regard to the mobile device 100. However, such teachings apply equally to other types of devices. FIG. 32 shows the mobile device 100 having various components, but it is understood that implementing all of the illustrated components is not a requirement. Greater or fewer components may alternatively be implemented.

As shown, the mobile device 100 includes a wireless communication unit 110 configured with several commonly implemented components. For instance, the wireless communication unit 110 typically includes one or more components which permits wireless communication between the mobile device 100 and a wireless communication system or network within which the mobile device is located.

Further, the broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal. Also, the broadcast receiving module 111 may be configured to receive broadcast signals transmitted from various types of broadcast systems. In a non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO) and integrated services digital broadcast-terrestrial (ISDB-T). Receiving of multicast signals is also possible. If desired, data received by the broadcast receiving module 111 may be stored in a suitable device, such as memory 160.

Further, the mobile communication module 112 transmits/receives wireless signals to/from one or more network entities (e.g., base station, Node-B). Such signals may represent audio, video, multimedia, control signaling, and data, among others. In addition, the wireless Internet module 113 supports Internet access for the mobile device. This module may be internally or externally coupled to the device.

In addition, the short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Also included is a Position-location module 115 that identifies or otherwise obtains the location of the mobile device. If desired, this module may be implemented using global positioning system (GPS) components which cooperate with associated satellites, network components, and combinations thereof.

An Audio/video (A/V) input unit 120 is configured to provide audio or video signal input to the mobile device. As shown, the A/V input unit 120 includes a camera 121 and a microphone 122. The camera receives and processes image frames of still pictures or video. Further, the microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a touch screen panel, a jog wheel and a jog switch.

Also, the sensing unit 140 provides status measurements of various aspects of the mobile device. For instance, the sensing unit may detect an open/close status of the mobile device, relative positioning of components (e.g., a display and keypad) of the mobile device, a change of position of the mobile device or a component of the mobile device, a presence or absence of user contact with the mobile device, orientation or acceleration/deceleration of the mobile device.

The sensing unit 140 may comprise an inertia sensor for detecting movement or position of the mobile device such as a gyro sensor, an acceleration sensor etc. or a distance sensor for detecting or measuring the distance relationship between the user's body and the mobile device. Also, the sensing unit 140 may comprise capacitive touchscreen, IR touchscreen, EMR digitizer or ultrasonic sensor, etc.

In addition, the interface unit 170 is often implemented to couple the mobile device with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 generally includes various components which support the output requirements of the mobile device. Display 151 is typically implemented to visually display information associated with the mobile device 100. For instance, if the mobile device is operating in a phone call mode, the display will generally provide a user interface or graphical user interface which includes information associated with placing, conducting, and terminating a phone call. As another example, if the mobile device 100 is in a video call mode or a photographing mode, the display 151 may additionally or alternatively display images which are associated with these modes.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile device may include one or more of such displays.

The mobile device 100 also includes an output unit 150 having an audio output module 152 which supports the audio output requirements of the mobile device 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile device. Typical events include call received, message received and user input received. An example of such output includes the providing of tactile sensations (e.g., vibration) to a user. For instance, the alarm 153 may be configured to vibrate responsive to the mobile device receiving a call or message.

As another example, a vibration is provided by alarm 153 as a feedback responsive to receiving user input at the mobile device, thus providing a tactile feedback mechanism. It is understood that the various output provided by the components of output unit 150 may be separately performed, or such output may be performed using any combination of such components.

The memory 160 is generally used to store various types of data to support the processing, control, and storage requirements of the mobile device. Examples of such data include program instructions for applications operating on the mobile device, contact data, phonebook data, messages, pictures, video, etc. The memory 160 shown in FIG. 32 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile device. For instance, the controller performs the control and processing associated with voice calls, data communications, video calls, camera operations and recording operations. If desired, the controller may include a multimedia module 181 which provides multimedia playback. The multimedia module may be configured as part of the controller 180, or this module may be implemented as a separate component. In addition, the power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

The mobile device 100 of FIG. 32 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 33:
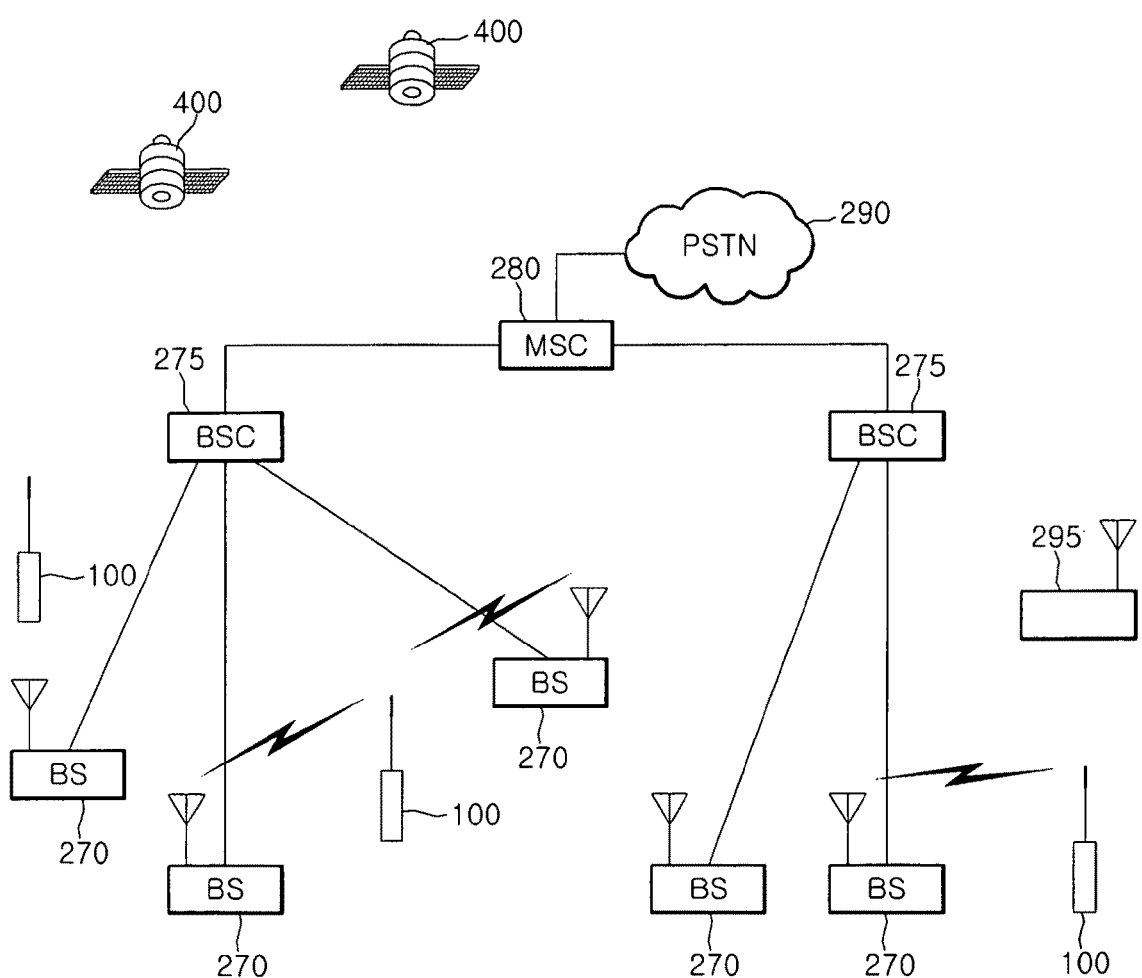
FIG. 33 is a block diagram illustrating a CDMA wireless communication system employing the mobile terminal of FIG. 32.

Referring now to FIG. 33, a CDMA wireless communication system is shown having a plurality of the mobile devices 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

In addition, each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A terrestrial digital multimedia broadcasting (DMB) transmitter 295 is shown broadcasting to the mobile/portable devices 100 operating within the system. The broadcast receiving module 111 (FIG. 32) of the portable device is typically configured to receive broadcast signals transmitted by the DMB transmitter 295. Similar arrangements may be implemented for other types of broadcast and multicast signaling (as discussed above).

FIG. 33 further depicts several global positioning system (GPS) satellites 400. Such satellites facilitate locating the position of some or all of the mobile devices 100. Two satellites are depicted, but it is understood that useful positioning information may be obtained with greater or fewer satellites. The position-location module 115 (FIG. 32) of the mobile device 100 is typically configured to cooperate with the satellites 400 to obtain desired position information. It is to be appreciated that other types of position detection technology, (i.e., location technology that may be used in addition to or instead of GPS location technology) may alternatively be implemented. If desired, some or all of the GPS satellites 400 may alternatively or additionally be configured to provide satellite DMB transmissions.

During typical operation of the wireless communication system, the base stations 270 receive sets of reverse-link signals from various mobile devices 100. The mobile devices 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile devices 100.

Although embodiments have been described with reference to a number of illustrative embodiments thereof, it should be understood that numerous other modifications and embodiments can be devised by those skilled in the art that will fall within the spirit and scope of the principles of this disclosure.

What is claimed is:

1. An input device, comprising:
a detecting unit configured to detect an object moving with respect to the input device; and
a control unit configured to determine what region among a plurality of regions above the input device the object is within with respect to the input device, and to provide feedback based on what region the object is determined to be within,
wherein the control unit is configured to determine a first coordinate corresponding to a Z-distance of an untouched state between the object and the input device, and second and third coordinates corresponding to an X-Y location of the object with respect to the input device, and wherein the first coordinate corresponds to the plurality of regions including at least first, second and third regions above the input device, the first region is closer to the input device than the second region, and the second region is closer to the input device than the third region,
wherein the control unit is configured to vary an intensity of sound or vibration according to the Z-distance of the untouched state between the object and the input device in order to provide the feedback, wherein the intensity in the first region is greater than the intensity in the second region, and the intensity in the second region is greater than the intensity in the third region, wherein both the intensity in the first region and the intensity in the second region are not zero, wherein the control unit is configured to enlarge a graphic of an icon corresponding to the X-Y location of the object based on the Z-distance of the untouched state without executing the icon until the object touches the input device, wherein the size of the graphic of the icon in the first region is bigger than the size of the graphic of the icon in the second region, and the size of the graphic of the icon in the second region is bigger than the size of the graphic of the icon in the third region, and wherein the control unit is configured to ignore the object if a measured area of the object is larger than a predetermined value.

2. The input device of claim 1, wherein the control unit is further configured to provide an increased feedback as the object moves from the third region to the first region and provide a decreased feedback as the object moves from the first region to the third region.

3. The input device of claim 2, wherein the control unit is further configured to provide the increased feedback in a continuous manner as the object moves between the first and third regions or in a discrete manner as the object moves between the first and third regions.

4. The input device of claim 1, wherein the control unit is further configured to change a brightness of a predetermined number of an array of light emitting devices disposed around the input device according to at least one of the Z-distance of the untouched state between the object and the input device and the X-Y location of the object with respect to the input device.

5. The input device of claim 1, wherein the control unit is further configured to display a pointer at a position dependent on the X-Y location of the object, and to change a size of the pointer step by step according to the Z-distance of the untouched state between the object and the input device.

6. The input device of claim 1, wherein the input device is one of a touchscreen input device and a touchpad input device included in one of a mobile terminal, laptop, kiosk and personal computer.

7. A method of controlling an input device, the method comprising:

detecting an object moving with respect to the input device;

determining what region among a plurality of regions above the input device the object is within with respect to the input device; and providing feedback based on what region the object is determined to be within, wherein the determining step comprises determining a first coordinate corresponding to a Z-distance of an untouched state between the object and the input device, and second and third coordinates corresponding to an X-Y location of the object with respect to the input device, and wherein the first coordinate corresponds to the plurality of regions including at least first, second and third regions above the input device, the first region is closer to the input device than the second region, and the second region is closer to the input device than the third region, wherein the providing step comprises varying an intensity of sound or vibration according to the Z-distance of the untouched state between the object and the input device in order to provide the feedback, wherein the intensity in the first region is greater than the intensity in the second region, and the intensity in the second region is greater than the intensity in the third region, wherein both the intensity in the first region and the intensity in the second region are not zero, wherein the method further comprises:

enlarging a graphic of an icon corresponding to the X-Y location of the object based on the Z-distance of the untouched state without executing the icon until the object touches the input device, wherein the size of the graphic of the icon in the first region is bigger than the size of the graphic of the icon in the second region, and the size of the graphic of the icon in the second region is bigger than the size of the graphic of the icon in the third region, and wherein the control unit is configured to ignore the object if a measured area of the object is larger than a predetermined value.

8. The method of claim 7, wherein the providing step comprises providing an increased feedback as the object moves from the third region to the first region and providing a decreased feedback as the object moves from the first region to the third region.

9. The method of claim 8, wherein the increased feedback is provided in a continuous manner as the object moves between the first and third regions or in a discrete manner as the object moves between the first and third regions.

10. The method of claim 7, wherein the providing step changes a brightness of a predetermined number of an array of light emitting devices disposed around the input device according to at least one of the Z-distance of the untouched state between the object and the input device and the X-Y location of the object with respect to the input device.

11. The method of claim 7, wherein the providing step includes:

displaying a pointer at a position dependent on the X-Y location of the object; and changing a size of the pointer step by step according to the Z-distance of the untouched state between the object and the input device.

12. The method of claim 7, wherein the input device is one of a touchscreen input device and a touchpad input device.

13. A mobile terminal, comprising:

a display including a touch input device;

a detecting unit configured to detect an object moving with respect to the touch input device; and a control unit configured to determine what region among a plurality of regions above the touch input device the object is within with respect to the touch input device, and to provide feedback based on what region the object is determined to be within, wherein the control unit is configured to determine a first coordinate corresponding to a Z-distance of an untouched state between the object and the input device, and second and third coordinates corresponding to an X-Y location of the object with respect to the input device, and wherein the first coordinate corresponds to the plurality of regions including at least first, second and third regions above the input device, the first region is closer to the input device than the second region, and the second region is closer to the input device than the third region, wherein the control unit is configured to vary an intensity of sound or vibration according to the Z-distance of the untouched state between the object and the input device in order to provide the feedback, wherein the intensity in the first region is greater than the intensity in the second region, and the intensity in the second region is greater than the intensity in the third region, wherein both the intensity in the first region and the intensity in the second region are not zero, wherein the control unit is configured to enlarge a graphic of an icon corresponding to the X-Y location of the object based on the Z-distance of the untouched state without executing the icon until the object touches the input device, wherein the size of the graphic icon in the first region is bigger than the size of the graphic of the icon in the second region, and the size of the graphic of the icon in the second region is bigger than the size of the graphic of the icon in the third region, and wherein the control unit is configured to ignore the object if a measured area of the object is larger than a predetermined value.

* * * * *